US012204449B2

(12) United States Patent
Bak et al.

(10) Patent No.: US 12,204,449 B2
(45) Date of Patent: *Jan. 21, 2025

(54) COMPUTER MEMORY MANAGEMENT IN COMPUTING DEVICES

(71) Applicant: Microsoft Technology Licensing, LLC, Redmond, WA (US)

(72) Inventors: Yevgeniy M. Bak, Redmond, WA (US); Kevin Michael Broas, Kirkland, WA (US); David Alan Hepkin, Redmond, WA (US); Landy Wang, Honolulu, HI (US); Mehmet Iyigun, Kirkland, WA (US); Brandon Alec Allsop, Monroe, WA (US); Arun U. Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,936

(22) Filed: Feb. 13, 2023

(65) Prior Publication Data
US 2023/0244601 A1    Aug. 3, 2023

Related U.S. Application Data

(63) Continuation of application No. 16/851,263, filed on Apr. 17, 2020, now Pat. No. 11,580,019.

(51) Int. Cl.
*G06F 12/06* (2006.01)
*G06F 9/4401* (2018.01)
(Continued)

(52) U.S. Cl.
CPC ........ *G06F 12/0646* (2013.01); *G06F 9/4406* (2013.01); *G06F 9/541* (2013.01); *G06F 12/023* (2013.01); *G06F 2212/1044* (2013.01)

(58) Field of Classification Search
CPC .. G06F 12/0646; G06F 12/123; G06F 9/4406; G06F 9/541; G06F 12/1036; G06F 2212/652
See application file for complete search history.

(56) References Cited

U.S. PATENT DOCUMENTS

2010/0169536 A1* 7/2010 Shedel ................ G06F 9/45558
718/1
2015/0324131 A1* 11/2015 Loh ....................... G06F 3/0608
711/117
(Continued)

OTHER PUBLICATIONS

Communication 71(3) Received for European Application No. 21716034, mailed on Feb. 29, 2024, 8 pages.

*Primary Examiner* — Tracy A Warren

(57) ABSTRACT

Techniques for computer memory management are disclosed herein. In one embodiment, a method includes in response to receiving a request for allocation of memory, determining whether the request is for allocation from a first memory region or a second memory region of the physical memory. The first memory region has first memory subregions of a first size and the second memory region having second memory subregions of a second size larger than the first size of the first memory region. The method further includes in response to determining that the request for allocation of memory is for allocation from the first or second memory region, allocating a portion of the first or second multiple memory subregions of the first or second memory region, respectively, in response to the request.

20 Claims, 8 Drawing Sheets

(51) Int. Cl.
*G06F 9/54* (2006.01)
*G06F 12/02* (2006.01)

(56) References Cited

U.S. PATENT DOCUMENTS

| 2018/0336106 A1* | 11/2018 | Cao | G06F 11/2097 |
| 2020/0249969 A1* | 8/2020 | Jeong | G06F 9/45558 |
| 2020/0249976 A1* | 8/2020 | Tateno | G06F 9/45558 |

* cited by examiner

COMPUTER MEMORY MANAGEMENT IN COMPUTING DEVICES

CROSS-REFERENCE TO RELATED APPLICATIONS

This application is a continuation of U.S. patent application Ser. No. 16/851,263 filed Apr. 17, 2020, entitled "Computer Memory Management in Computing Devices," which is incorporated herein by reference in its entirety.

BACKGROUND

In computing, memory management is a form of resource management applied to computer memory, such as random-access memory ("RAM") in a computing device. For example, a memory manager at an operating system can initially allocate an amount of memory space (often referred to as "blocks") to a program or process executed by a processor in the computing device. The processor can then utilize the allocated memory space for holding objects and data structures corresponding to the executed program or process. Once the allocated memory space is no longer needed, for instance, when execution of the program or process is finished, the memory manager can deallocate or "free" the previously allocated memory space to be reused for other programs or processes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing devices, a memory manager can manage computer memory such as RAM in a computing device by subdividing the computer memory into multiple memory segments or "pages" of a certain data size (e.g., 4 KB). The memory manager can also reserve a certain amount of memory space (referred to herein as "metadata memory") in the computer memory for holding metadata for each of the memory pages. The metadata memory can contain metadata indicating whether a corresponding memory page is allocated, deallocated, or contain other suitable state information.

During operation, when a request for an amount of memory (e.g., 1 MB) is received from a program or process, the memory manager can search the metadata memory and locate memory pages (e.g., 256 memory pages of 4 KB each) suitable for the request. The memory manager can then perform allocation of the multiple memory pages to the program or process by informing the program or process regarding the allocated memory pages. The memory manager can also modify metadata in the corresponding metadata memory to reflect that the memory pages have been allocated to the program or process.

The foregoing technique of memory management have certain drawbacks when being applied to computing devices with large amounts of computer memory. In one aspect, the metadata memory can represent significant overhead in the computing devices because the metadata memory cannot be allocated to facilitate execution of programs or processes. For example, a server in a cloud computing facility may have multiple gigabytes or even terabytes of computer memory. Though a percentage of the metadata memory over an overall size of computer memory is typically around 1%, an actual size of the metadata memory can become significant when a size of the overall computer memory is large. For instance, the metadata memory can have a size of around ten gigabytes when a computing device has one terabyte of computer memory. In another aspect, updating metadata when allocating large numbers of memory pages to a requesting program or process can cause high processing latency that reduces system performance in the computing device. For instance, to allocate one gigabyte of memory to a requesting program or process, the memory manager individually updates metadata in the metadata memory for each of 262,144 memory pages of 4 KB each. Such update processing can incur significantly amount of time, and thus reduce responsiveness of the memory allocation operation.

Several embodiments of the disclosed technology can address several aspects of the above drawbacks by implementing multiple functional types of memory coexisting on a physical memory in a computing device and concurrently tracking status of memory subdivisions of different sizes with an operating system in the computing device. In certain implementations, a physical memory having an overall size (e.g., one terabyte) can be divided into a first memory region of a first functional type and a second memory region of a second functional type. The first and second memory regions can each have a preconfigured size or percentage of the overall size. In certain embodiments, the preconfigured size or percentage of the first and/or second memory regions can be set by a user of the computing device and persistently stored in a configuration file at the computing device. In other embodiments, the preconfigured size or percentage can have default values, can be set during operation, or set in other suitable manners. In further embodiments, at least a part of the first memory region can be converted into the second functional types during operation, or vice versa, as discussed in more detail herein.

In certain implementations, the first memory region can be configured to be available for allocation by an operating system of the computing device. For instance, the first memory region can be subdivided into multiple memory subregions of a first size (e.g., a size of a memory page in the physical memory such as 4 KB) individually having a designated metadata memory in the first memory region for holding metadata of the memory subregions. The first memory region can also be configured to support a first set of memory management operations. Examples of such memory management operations can include operations for allocation, deallocation, swapping, memory protection, segmentation, error checking, and other suitable tasks. During operation, the operating system at the computing device can allocate memory from the first memory region to programs or processes executing on top of the operating system at the computing device.

The second memory region can be configured to be available for allocation to virtual machines, containers, or other suitable guest operating systems hosted on the computing device, but not available for allocation to the operating system of the computing device. In one example, the second memory region can be subdivided into multiple memory subregions of a second size (e.g., 1 GB) that is larger than the first size of the first functional type. It is also recognized that not all memory management operations may be suitable for memory allocated to a guest operating system. As such, the second memory region can also be configured to support a second set of memory management operations that are different than the first set of memory management operations. For instance, memory allocated to a virtual machine may not require operations other than allocation and deallocation. As such, the second set can support only allocation and deallocation of memory from the second memory region, but not other operations supported by the first set.

During startup, the computing device can initialize the physical memory as having the coexisting first and second memory regions according to the configuration file and concurrently tracking status of memory subdivisions in the first and second memory regions with a memory manager. During operation, upon receiving a first request for memory from a program or process executing in the operating system, the memory manager can allocate a portion of the first memory region to the program or process and update corresponding metadata memory accordingly. Upon receiving a second request for memory from, for instance, a virtual machine manager for a virtual machine to be instantiated on the computing device, the memory manager can be configured to allocate a portion of the second memory region instead of the first memory region for use by the virtual machine. The memory manager can be configured to distinguish the first and second requests in various manners. In one example, the memory manager (or other components of the operating system) can provide distinct Application Programming Interfaces ("APIs") each configured to receive the first or second request, respectively. In other examples, the memory manager can be configured to distinguish the first and second requests based on metadata included with the first and second requests or in other suitable manners.

Several embodiments of the disclosed technology can significantly reduce memory overhead in the computing device. By subdividing the second memory region according to the second size larger than the first size and concurrently tracking status of memory subregions of different sizes with the memory manager, an amount of metadata for the second memory region can be significantly reduced. For example, assuming a 1% overhead for the metadata memory, subdividing one terabyte of memory into memory pages of 4 KB each results in about ten gigabytes of metadata memory. On the other hand, subdividing one terabyte of memory into memory subregions of one gigabyte each results in about 40 kilobytes of metadata memory. By reducing the memory overhead, more memory space in the physical memory may be available for allocation to virtual machines or containers for executing computing tasks. In addition, computing operations such as search, lock, and/or update the metadata can become more performant, as the metadata to be parsed is much smaller. As such, costs for providing computing services from the virtual machines or container at the computing device may be reduced.

Further, processing latency of allocating memory from the second memory region to virtual machines, containers, or other suitable types of guest operating systems can be much lower than allocating memory from the first memory region. The second functional type can have much larger memory subregions than the first functional type. As such, a number of updates to the metadata memory during allocation can be significantly decreased when compared to allocating from the first memory region. For example, allocating one terabyte memory of 4 KB each involves updating metadata in about 10 gigabytes of metadata memory. In contrast, allocating one terabyte memory of one gigabyte each includes updating metadata in about 40 kilobytes of metadata memory. As a result, the computing system performance (e.g., for operations such as instantiating virtual machines or containers) may use less energy and execute more rapidly.

In certain embodiments, at least a portion of the first memory region can be converted to the second functional type, or vice versa. For example, after initialization, a user of the computing device may issue a command to convert a portion of the second memory region into the first functional type. In response, the memory manager can remap or redistribute a portion of the physical memory mapped to the second memory region to the first functional type. For instance, the memory manager may re-designate a one-gigabyte memory block from the second memory region as the first functional type. The memory manager can then subdivide the one gigabyte memory block into multiple 4 KB memory pages and marking the multiple 4 KB memory pages as available for allocation by the operating system. In other embodiments, relative size of the first and second memory regions can be modified by updating the configuration file and reinitializing the computing device or via other suitable techniques.

In further embodiments, the computing device may include multiple physical memories that are either local or remotely accessible by the computing device. For example, Non-Uniform Memory Access ("NUMA") is a computer memory design according to which a processor can access both local memory and non-local memory (e.g., memory local to another processor or memory shared between processors). Each local or non-local memory can form a NUMA node. In accordance with several aspects of the disclosed technology, each NUMA node can have corresponding ratios of the first and second memory regions from 0% to 100%. In one example, one NUMA node can include only a first memory region while another NUMA node includes only a second memory region. In other examples, at least some of the NUMA nodes can include both the first and second memory regions at the same ratio or at different ratios.

Several embodiments of the disclosed technology can also facilitate efficient update/reset of the operating system on the computing device while maintaining state information of virtual machines or containers hosted on the computing device. For example, during a Kernel Software Reset ("KSR"), the memory manager can be configured to maintain the mapping and distribution of the first and second memory regions. Data of the operating system in the first memory region can then be overwritten and updated while data in the second memory region is maintained. After reinitializing the operating system in the first memory region, various virtual machines or containers can be resumed on the computing device based on the maintained state information in the second memory region. As such, fast update/reset of the operating system on the computing device can be achieved while preserving the state information of the virtual machines or containers.

DETAILED DESCRIPTION

Figure 1:
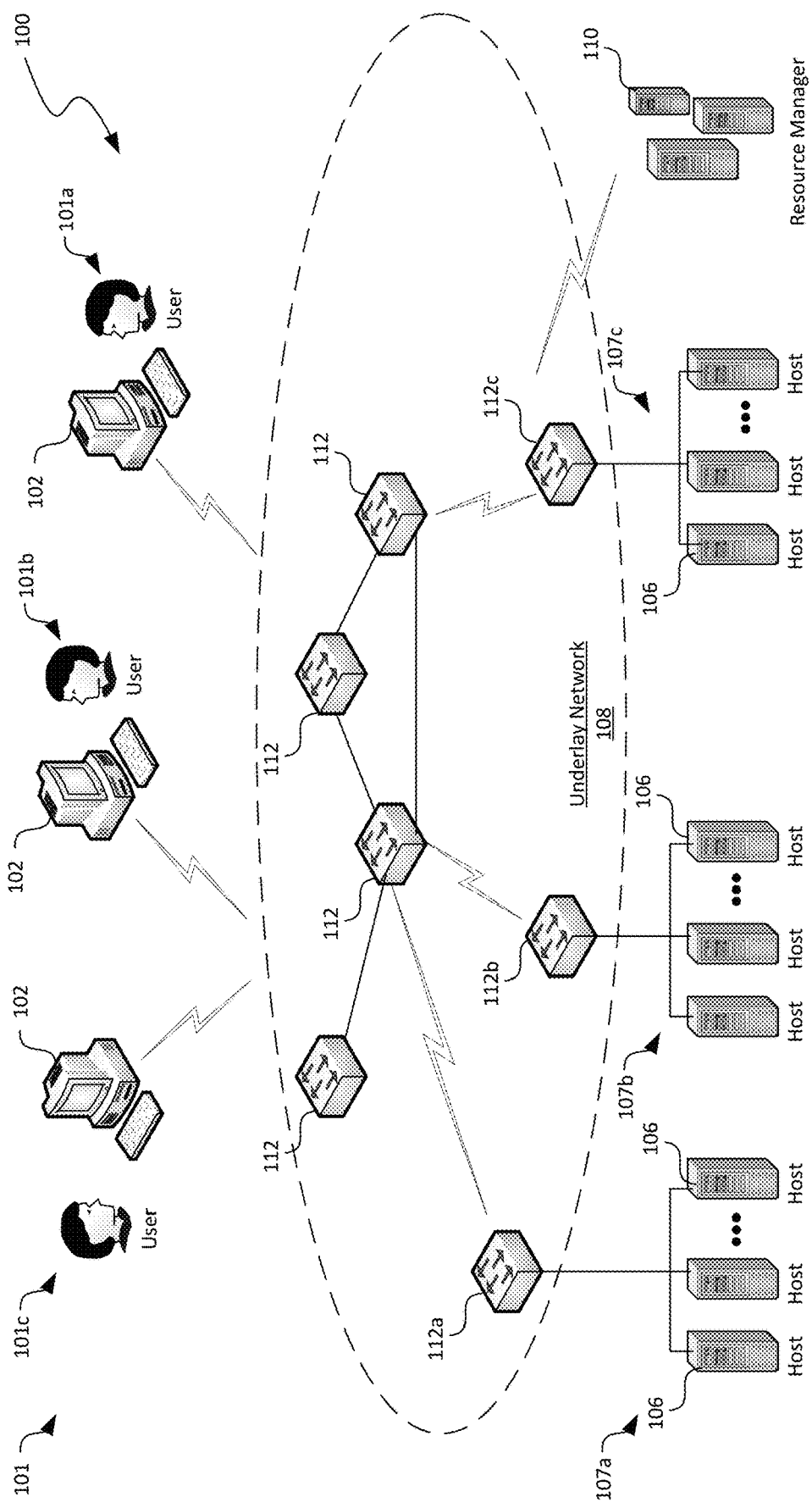
FIG. 1 is a schematic diagram illustrating a distributed computing system implementing computer memory management in accordance with embodiments of the disclosed technology.

Certain embodiments of systems, devices, components, modules, routines, data structures, and processes for computer memory management are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term a "distributed computing system" generally refers to a computing facility having a computer network interconnecting a plurality of host machines to one another or to external networks (e.g., the Internet). An example of such a computing facility can include a datacenter for providing cloud computing services. A compute network can include a plurality of network devices. The term "network device" generally refers to a physical network device, examples of which include routers, switches, hubs, bridges, load balancers, security gateways, or firewalls.

As used herein, a "host computing device" or "host" generally refers to a computing device configured to support execution of one or more applications or computer programs. In certain embodiments, the host can include a host operating system configured to support execution of applications or computer programs. In other embodiments, the host can also support implementation of, for instance, one or more virtual machines (VMs), containers, or other suitable virtualized components. For example, a host can include a server having a hypervisor configured to support one or more virtual machines, containers, or other suitable types of virtual components. The one or more virtual machines or containers can be used to launch and execute suitable applications or computer programs to provide corresponding computing services.

Also used herein, a "host operating system" generally refers to an operating system deployed to interact directly with hardware components of a computer device (e.g., a server) and can grant or deny system level access to services provided by the host operating system. In certain implementations, a hypervisor (e.g., a hosted hypervisor) can run on top of a host operating system rather than interacting directly with the hardware components of the computing device. The hypervisor can then create, manage, or otherwise support one or more VMs or containers each having a "guest operating system" or "guest" separated from the host operating system by a security boundary. In certain implementations, a guest operating system may not be the same as a host operating system supporting the guest operating system.

As used herein, a "hypervisor" generally refers to computer software, firmware, and/or hardware that creates, manages, and runs one or more virtual machines on a host machine. A "virtual machine" or "VM" is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

Also used herein, the term "computing service" or "cloud service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, a memory region generally refers to a portion of a physical memory with a number of memory subregions, blocks, pages, or other suitable subdivisions. For example, a memory region can include one terabyte of physical memory that is divided into one thousand memory subregions of one gigabyte each. Each of the memory subregions can also include a certain amount of designated memory (referred to herein as "metadata memory") for storing metadata of the corresponding memory subregions. The metadata can contain information indicating a state of the memory subregions such as, for instance, allocation status, refreshing status, etc.

In certain computing devices, a physical memory can be subdivided into multiple memory pages of a certain size (e.g., 4 KB). During operation, when a request for an amount of memory (e.g., 1 MB) is received from a program or process, a memory manager can search metadata memory and locate memory pages (e.g., 256 memory pages of 4 KB each) suitable for the request. The memory manager can then perform allocation of the multiple memory pages to the program or process by informing the program or process regarding the allocated memory pages. The memory manager can also modify metadata in the corresponding metadata memory to reflect that the memory pages have been allocated to the program or process.

The foregoing technique of memory management have certain drawbacks when being applied to computing devices with large amounts of computer memory. In one aspect, the metadata memory can represent significant overhead in the computing devices because the metadata memory cannot be allocated to facilitate execution of programs or processes. In another aspect, updating metadata of a large number of memory pages when allocating the memory pages to a requesting program or process can cause high processing latency that reduces system performance in the computing device.

Several embodiments of the disclosed technology can address several aspects of the above drawbacks by implementing multiple functional types of memory coexisting on a physical memory in a computing device and concurrently tracking status of memory subdivisions of different sizes with an operating system in the computing device. For example, a physical memory having an overall size (e.g., one terabyte) can be divided into a first memory region of a first functional type and a second memory region of a second functional type. The first and second memory regions can each have a size or percentage of the overall size. The first and second memory regions can have memory subregions with different sizes and support different memory management operations. As such, when a request for memory is received, such request can be suitably served by allocating memory from either the first or second memory region, as described in more detail below with reference to FIGS. 1-7.

FIG. 1 is a schematic diagram illustrating a distributed computing system 100 having hosts 106 implementing computer memory management in accordance with embodiments of the disclosed technology. As shown in FIG. 1, the distributed computing system 100 can include a computer network (shown as an "underlay network 108") interconnecting a plurality of hosts 106, a plurality of client devices 102 of users 101, and a resource manager 110 to one another. The resource manager 110 can be a cluster controller, a fabric controller, a database controller, and/or other suitable types of controller configured to monitor and manage resources and operations of the hosts 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple hosts 106 and the client devices 102. In certain embodiments, the hosts 106 can be organized into racks, action zones, groups, sets, or other suitable divisions. For example, in the illustrated embodiment, the hosts 106 are grouped into three clusters identified individually as first, second, and third clusters 107a-107c. In the illustrated embodiment, each of the clusters 107a-107c is operatively coupled to a corresponding network device 112a-112c, respectively, which are commonly referred to as "top-of-rack" or "TOR" network devices. The TOR network devices 112a-112c can then be operatively coupled to additional network devices 112 to form a network in a hierarchical, flat, mesh, or other suitable types of topology. The computer network can allow communications among the hosts 106 and the client devices 102. In other embodiments, the multiple host machine sets 107a-107c can share a single network device 112 or can have other suitable arrangements.

The hosts 106 can individually be configured to provide computing, storage, and/or other suitable cloud computing services to the individual users 101. For example, as described in more detail below with reference to FIG. 2, each of the hosts 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the hosts 106 can provide virtual machines 144 for multiple users 101. In other embodiments, multiple hosts 106 can host virtual machines 144 for one or more users 101a-101c.

The client devices 102 can each include a computing device that facilitates corresponding users 101 or administrator 104 to access computing services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 or administrators to access cloud and/or other suitable types of computing services provided by the hosts 106 and/or other components in the distributed computing system 100.

Figure 2:
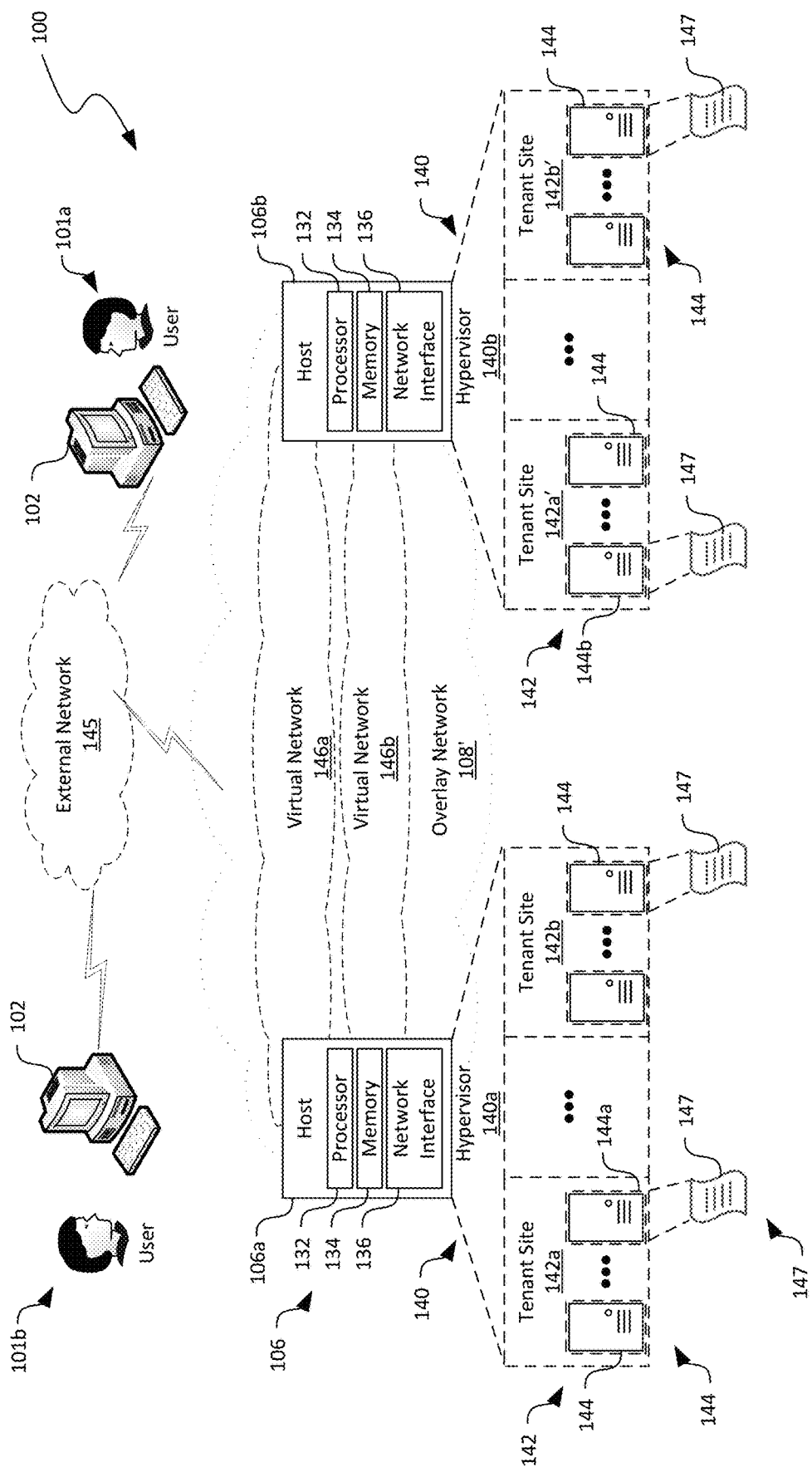
FIG. 2 is a schematic diagram illustrating certain hardware and software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first host 106a and the second host 106b can each include a CPU 132, a memory 134, and a network interface 136 operatively coupled to one another. The CPU 132 can include one or more processors, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 132 (e.g., instructions for performing the methods discussed below with reference to FIG. 6). The network interface 136 can include a network interface card, a connection converter, and/or other suitable types of input/output devices configured to accept input from and provide output to other components on the overlay networks 108'.

The first host 106a and the second host 106b can individually contain instructions in the memory 134 executable by the CPU 132 to cause the individual hosts 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as software components. However, in other embodiments, the hypervisors 140 can also include firmware and/or hardware components.

The tenant sites 142 can each include multiple virtual machines 144 for a particular tenant. For example, the first host 106a and the second host 106b can both host the tenant site 142a and 142a' for a first user 101a. The first host 106a and the second host 106b can both host the tenant site 142b and 142b' for a second user 101b. Each virtual machine 144 can be executing applications or processes 147 corresponding to an operating system, middleware, and/or suitable applications. The executed applications or processes 147 can each correspond to one or more computing services or other suitable types of computing services. Examples of such computing services can include platform services, microservices, authentication services, or other suitable types of services.

Also shown in FIG. 2, the computing system 100 can include an overlay network 108' having one or more virtual networks 146 that interconnect the tenant sites 142a and 142b across the first and second hosts 106a and 106b. For example, a first virtual network 146a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the hosts 106 can facilitate communications among the virtual machines and/or applications executing in the virtual machines 144. For example, the CPU 132 of the first host 106a can execute suitable network communication operations to facilitate the first virtual machine 144a to transmit packets to the second virtual machine 144b via the virtual network 146a by traversing the network interface 136 on the first host 106a, the underlay network 108 (FIG. 1), and the network interface 136 on the second host 106b. As such, the first virtual machine 144a of a tenant site 142a on the first host 106a can cooperate with another virtual machine 144b on another server 106b to execute suitable applications 147 or processes in order to provide suitable computing services to the users 101.

In order to host the virtual machines 144, the hosts 106 can allocate certain amount of memory space to the virtual machines 144. The inventors have recognized that having a fixed size (e.g., 4 KB) memory pages in the memories 134 may not be efficient for providing memory access to the virtual machines 144 or other suitable types of guest operating systems. For example, having a large number of 4 KB memory pages can result in a large amount of the memories 134 being designated as metadata memory, and thus increasing operation overhead in the memories 134. In another example, during allocation, updating each of a large number of 4 KB memory pages can result in high latency when instantiating the virtual machines 144. Several embodiments of the disclosed technology can address at least some aspects of the foregoing drawbacks by implementing multiple memory types in the memories 134 of the hosts 106 and concurrently tracking status of memory subdivisions of different sizes with an operating system such that the memory overhead and operation latency related to allocating memory to the virtual machines 144 can be reduced, as described in more detail below with reference to FIGS. 3A-4D.

Figure 3A:
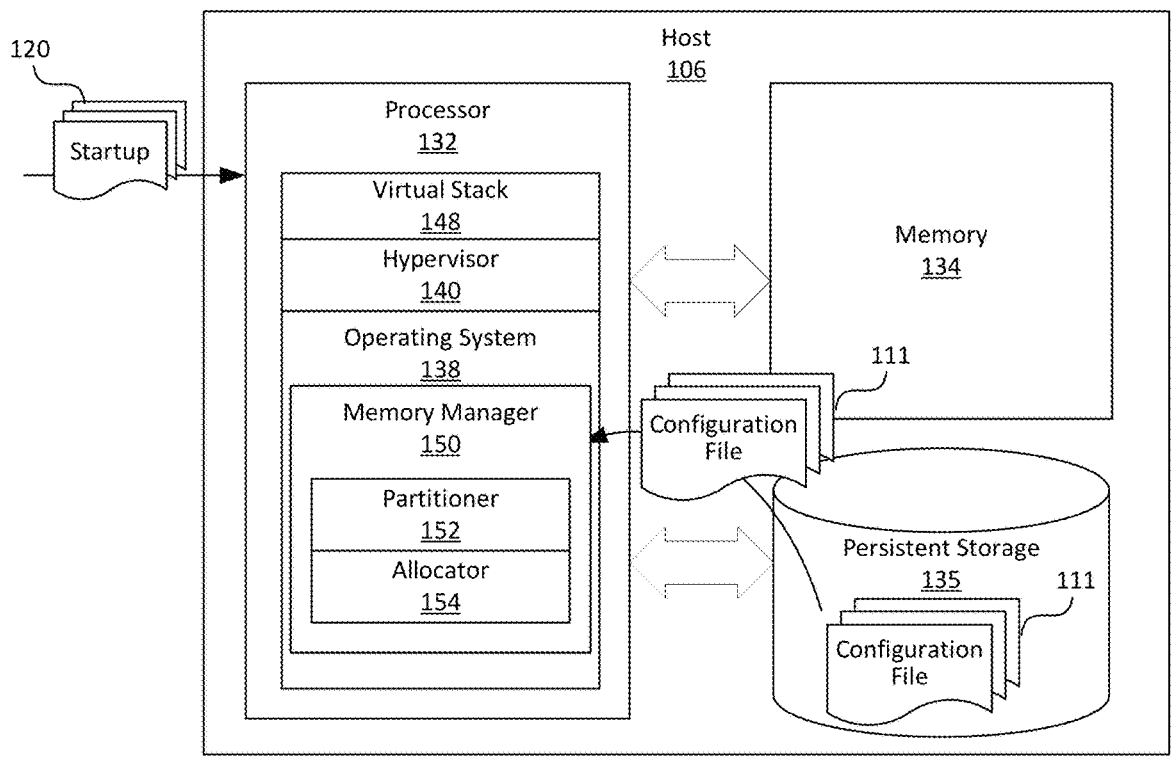
FIGS. 3A-3C are schematic diagrams of certain hardware/software components of a host of FIGS. 1 and 2 during stages of initializing memory regions in the host in accordance with embodiments of the disclosed technology.
Figure 3B:
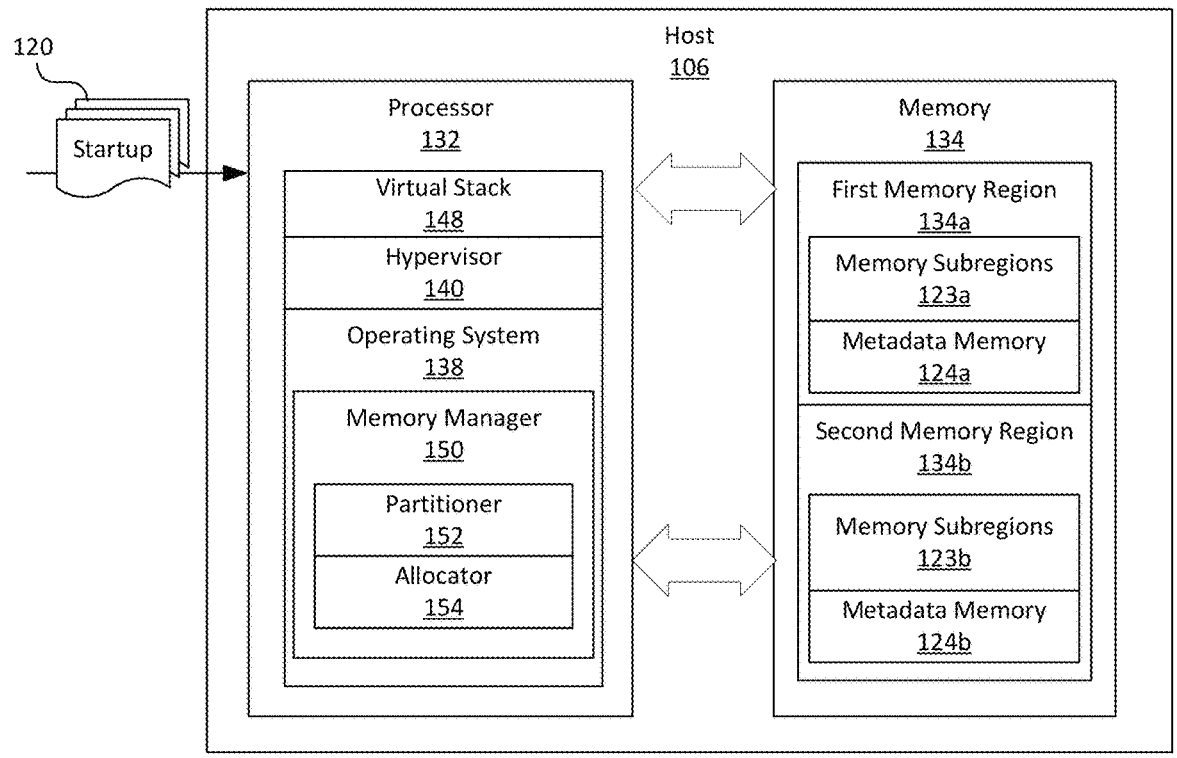
Figure 3C:
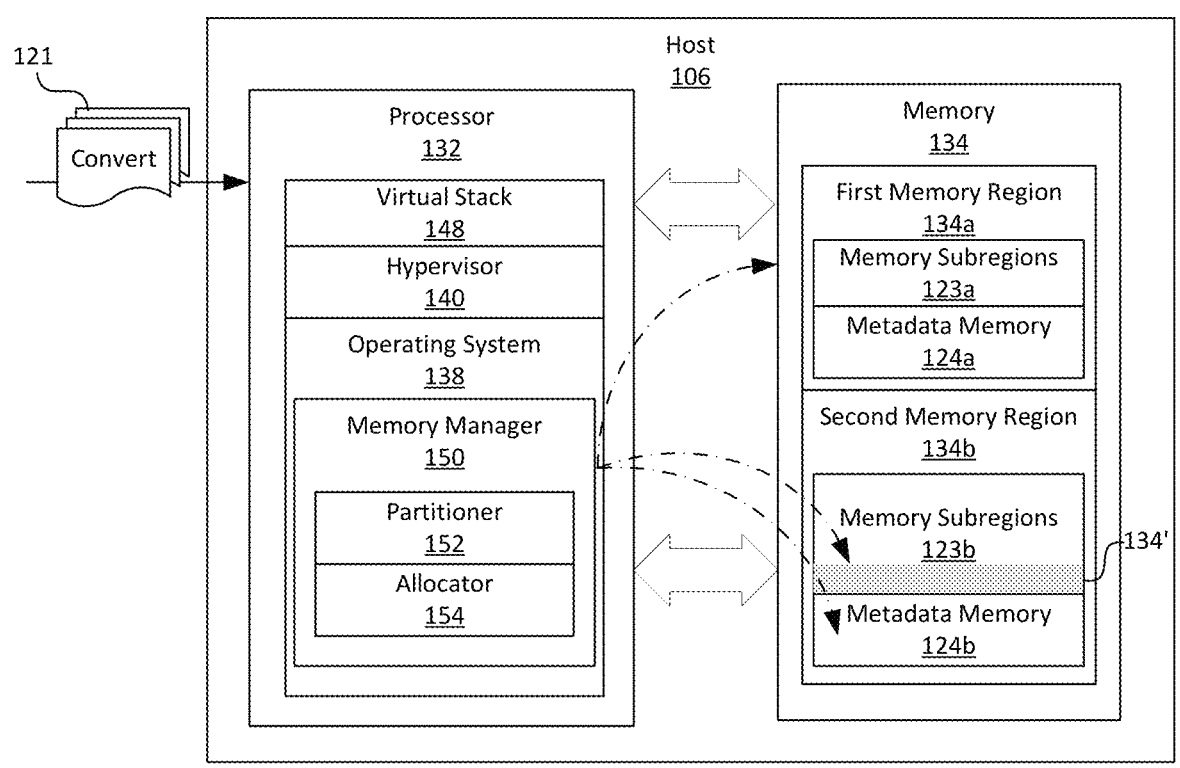

FIGS. 3A-3C are schematic diagrams of certain hardware/software components of a host of FIGS. 1 and 2 during stages of initializing memory regions in the host 106 in accordance with embodiments of the disclosed technology. Only certain components of the host 106 are shown in FIGS. 3A-3C for illustration purposes. In other embodiments, the host 106 can include additional memories 134 or other suitable components.

As shown in FIG. 3A, the processor 132 of the host 106 can execute suitable instructions to provide an operating system 138 that supports a hypervisor 140 and a virtual stack 148 operatively coupled with one another. The processor 132 is also operatively coupled to a physical memory 134 and a persistent storage 135 holding a memory configuration file 111. The virtual stack 148 can be configured to complement activities of the hypervisor 140 in running guest operating systems such as the virtual machines 144 in FIG. 2. For example, the virtual stack 148 can include software library components emulated devices, management services, and user interfaces.

The configuration file 111 can include data indicating partition settings of the physical memory 134 into multiple memory regions. In certain implementations, the physical memory 134 can have an overall size (e.g., one terabyte) can be divided into a first memory region 134a (shown in FIG. 3B) of a first functional type and a second memory region 134b (shown in FIG. 3B) of a second functional type. The first and second memory regions 134a and 134b can each have a preconfigured size or percentage of the overall size of the physical memory 134. In certain embodiments, the preconfigured size or percentage of the first and/or second memory regions can be set by a user 101 (FIG. 1) of the host 106 and persistently stored in the configuration file 111 at the persistent storage 135. In other embodiments, the preconfigured size or percentage can have default values, can be set during operation, or set in other suitable manners. In further embodiments, at least a part of the first memory region 134a can be converted into the second functional types during operation, or vice versa, as discussed in more detail with reference to FIG. 3C.

As shown in FIG. 3A, the memory manager 150 includes a partioner 152 and an allocator 154 operatively coupled to each other. Though only the foregoing components of the memory manager 150 are shown in FIG. 3A, in other embodiments, the memory manager 150 can include other suitable components in addition to the foregoing components shown in FIG. 3A.

The partioner 152 can be configured to partition the physical memory 134 into multiple memory regions according to the configuration file 111. For example, as shown in FIG. 3A, in response to receive a startup command 120, the partioner 152 of the memory manager 150 can be configured to retrieve the configuration file 111 from the persistent storage 135 and configure the first and second memory regions 134a and 134b accordingly. For example, the partioner 152 can be configured to subdivide a preconfigured size or percentage of the physical memory 134 into first and second memory regions 134a and 134b each with multiple memory subregions of a preset size according to the configuration file 111.

In certain implementations, the first memory region 134a can be subdivided into multiple memory subregions 123a of a first size (e.g., 4 KB, 1 MB, or 2 MB) individually having a designated metadata memory 124a in the first memory region 134a. The metadata memory 124a can be configured for holding metadata of the memory subregions 123a. The first memory region 134a can also be configured to support a first set of memory management operations. Examples of such memory management operations can include operations for allocation, deallocation, swapping, memory protection, segmentation, error checking, and other suitable tasks. During operation, the operating system 138 at the host 106 can allocate memory from the first memory region 134*a* to programs or processes executing on top of the operating system 138, as described in more detail below with reference to FIGS. 4A-4B.

The second memory region 134*b* can be subdivided into multiple memory subregions 123*b* of a second size (e.g., 1 GB) that is larger than the first size of the first functional type. It is also recognized that not all memory management operations may be suitable for memory allocated to a guest operating system such as the virtual machines in FIG. 2. As such, the second memory region 134*b* can also be configured to support a second set of memory management operations that are different than the first set of memory management operations. For instance, memory allocated to a virtual machine 144 may not require operations other than allocation and deallocation. As such, the second set can support only allocation and deallocation of memory from the second memory region 134*b*, but not other operations supported by the first set. During operation, the operating system 138 at the host 106 can allocate memory from the second memory region 134*b* to a virtual machine 144 (or other suitable types of guest operating system), as described in more detail below with reference to FIGS. 4C-4D.

As shown in FIG. 3C, in certain implementations, the relative proportion of the first and second memory regions 134*a* and 134*b* can be modified during operation. For example, upon receiving a convert command 121, the partitioner 152 can be configured to convert at least a portion of the first memory region to the second memory functional type, or vice versa. In the illustrated example in FIG. 3C, a portion of the first memory region 134*a* is shown being converted into the memory subregions 123*b* (shown with shading designated as 134') of the second memory region 134*b*. In other examples, one or more memory subregions 123*b* of the second memory region 134*b* can also be converted into memory subregions 123*a* of the first memory region 134*a*. The partitioner 152 can also be configured to designate and/or update the metadata memory 124*a* or 124*b* to reflect any conversion between the first and second memory regions 134*a* and 134*b*. Upon completion of portioning the physical memory 134, the memory manager 150 can be configured to allocate memory from the first and second memory regions 134*a* and 134*b* in accordance with a characteristic of a request for allocation, as described in more detail below with reference to FIGS. 4A-4D.

Figure 4A:
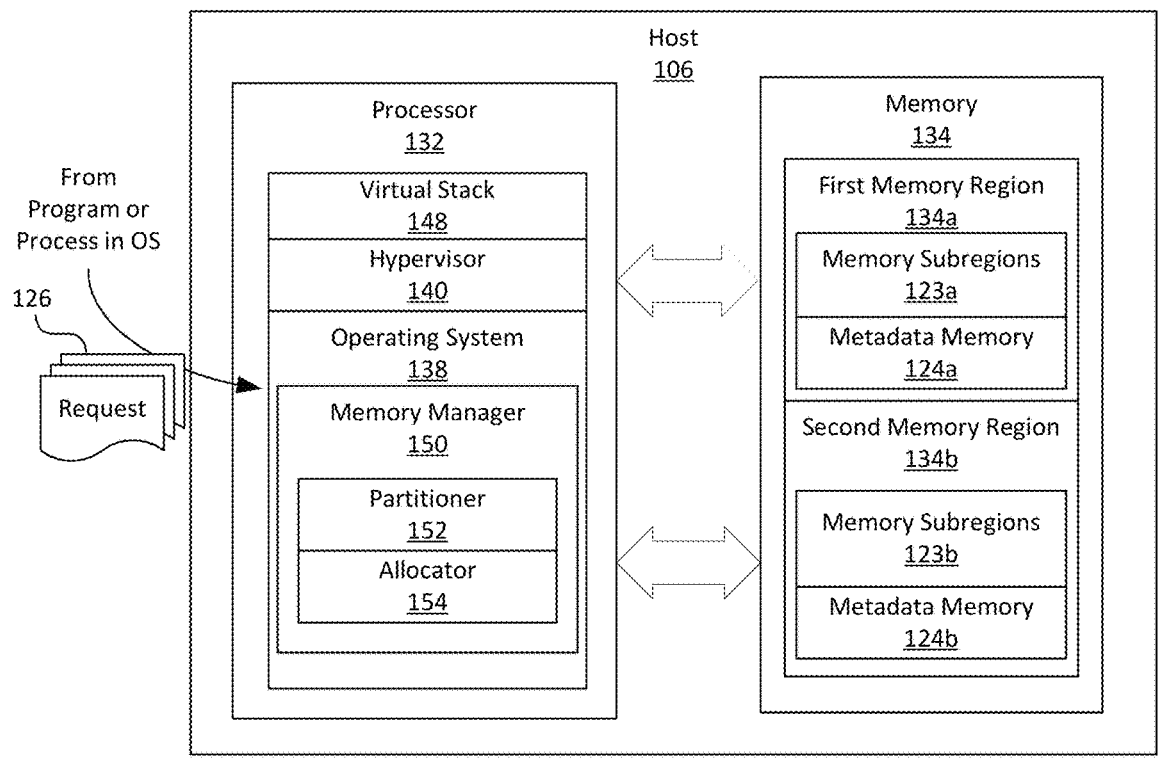
FIGS. 4A-4D are schematic diagrams of certain hardware/software components of a host of FIGS. 1 and 2 during stages of memory allocation in the host in accordance with embodiments of the disclosed technology.
Figure 4B:
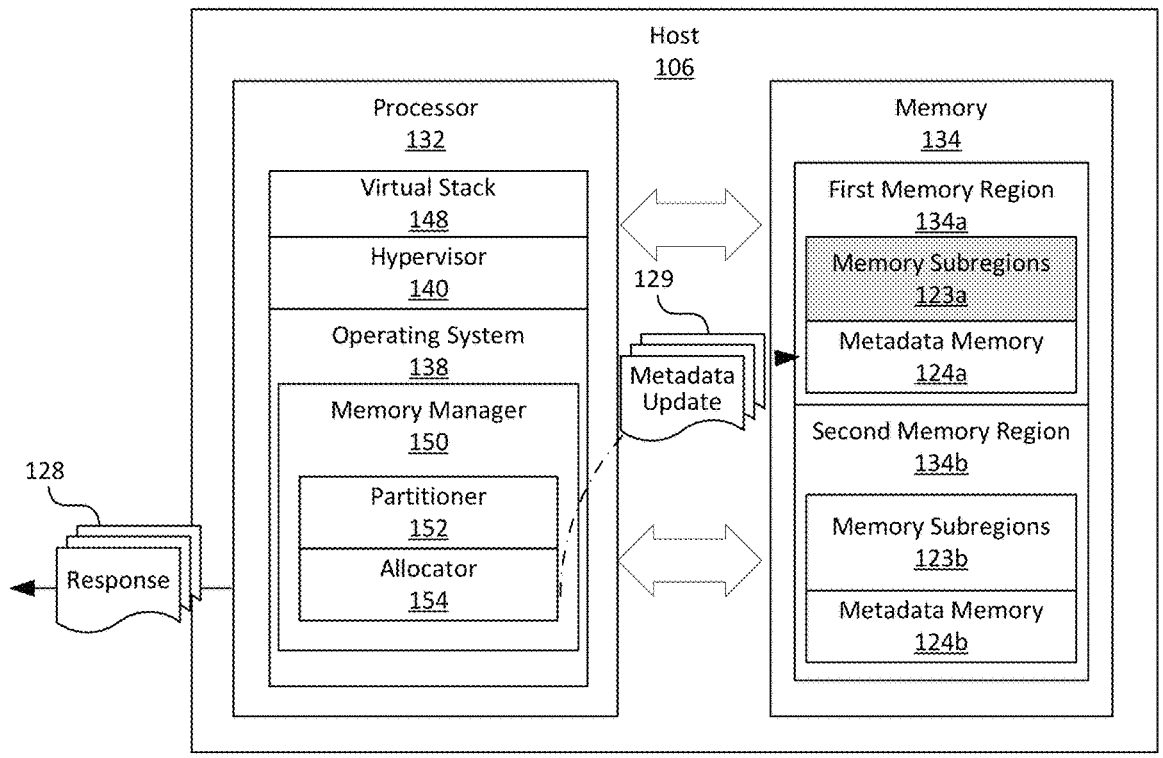

FIGS. 4A-4D are schematic diagrams of certain hardware/software components of a host of FIGS. 1 and 2 during stages of memory allocation in the host in accordance with embodiments of the disclosed technology. As shown in FIGS. 4A and 4B, during operation, upon receiving a first request 126 for memory from a program or process executing in the operating system 138, the allocator 154 of the memory manager 150 can be configured to allocate a portion of the first memory region 134*a* to the program or process. As such, the allocator 154 can be configured to provide a first response 128 to the program or process identifying one or more memory subregions 123*a* from the first memory region 134*a* and update corresponding metadata memory 124*a* accordingly.

Figure 4C:
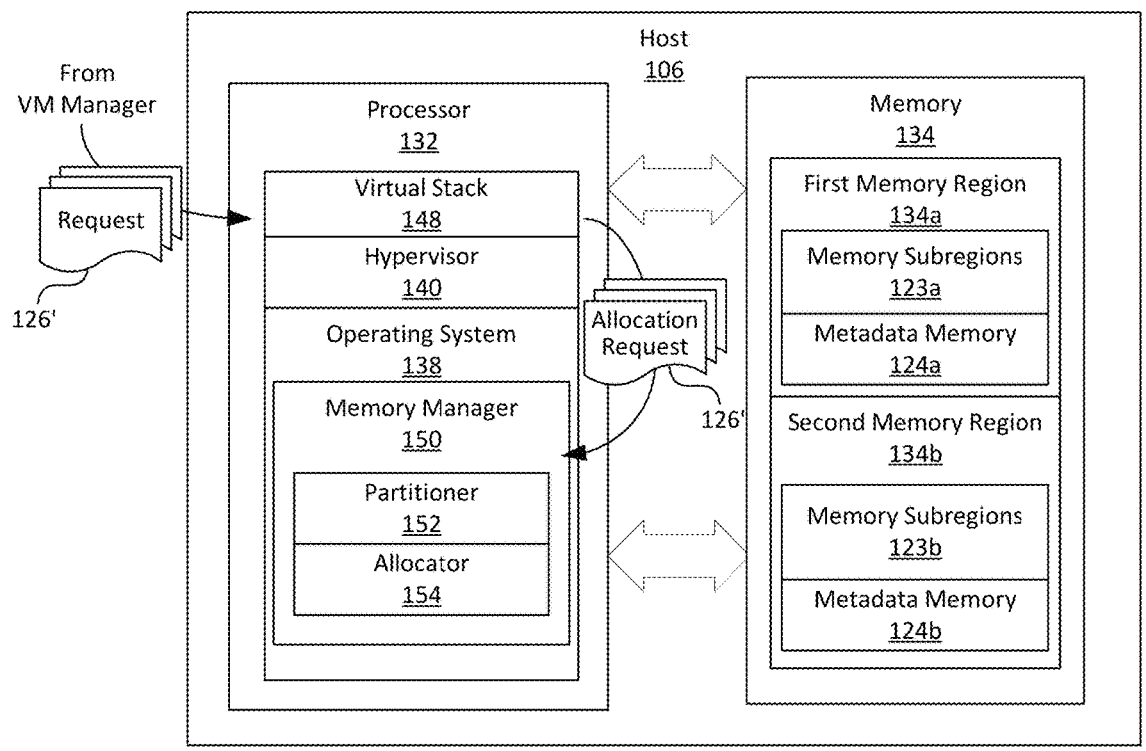
Figure 4D:
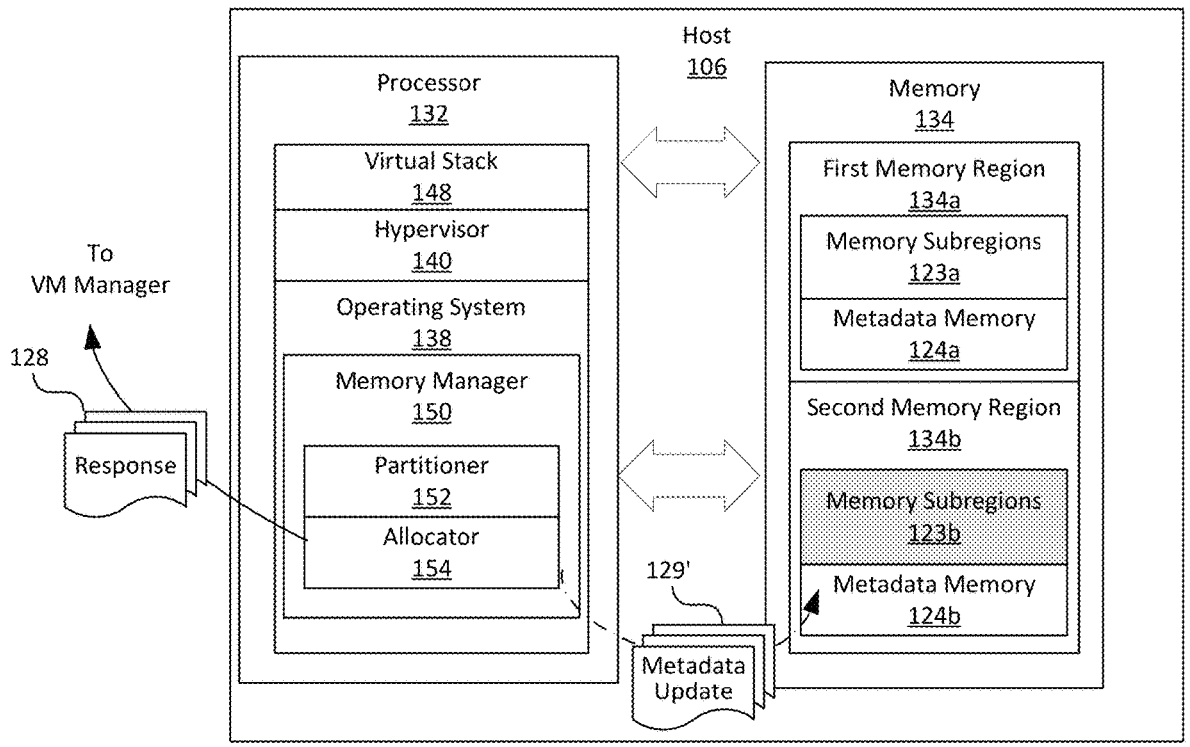

As shown in FIGS. 4C and 4D, a second request 126' can be received from, for instance, a virtual machine manager (not shown) for a virtual machine 144 (FIG. 2) to be instantiated on the host 106 via the virtual stack 148. In response, the allocator 154 of the memory manager 150 can be configured to allocate a portion of the second memory region 134*b* instead of the first memory region 134*a* for use by the virtual machine 144. As such, the allocator 154 can be configured to provide a second response 128' to the virtual machine manager identifying one or more memory subregions 123*b* from the second memory region 134*b* and update corresponding metadata memory 124*b* accordingly.

The allocator 154 of the memory manager 150 can be configured to distinguish the first and second requests 126 and 126' in various manners. In one example, the memory manager 150 (or other components of the operating system 138) can provide distinct Application Programming Interfaces ("APIs") each configured to receive the first or second request 126 and 126', respectively. As such, the allocator 154 can be configured to select one of the first or second memory regions 134*a* and 134*b* for allocating memory based on an identity of the API at which the first or second request 126 or 126' is received. In other examples, the allocator 154 can be configured to distinguish the first and second requests 126 and 126' based on metadata included with the first and second requests 126 and 126' or in other suitable manners. For instance, the memory manager 150 can be configured to maintain a list of registered processes for each of the first and second memory regions 134*a* and 134*b*. Upon receiving the first or second request 126 or 126', the memory manager 150 can be configured to identify the corresponding process and allocate from one of the first or second memory region 134*a* and 134*b* when the process is registered. Otherwise, the memory manager 150 can be configured to allocate from a default memory region (e.g., the first memory region 134*a*). Such registration can be per-thread, per-process, per-processor, or at other suitable basis. In other implementations, the hypervisor 140 can maintain a table of the metadata and use the metadata to determine which of the first or second memory region 134*a* and 134*b* to allocate based on a caller identity and a listing in the metadata table.

Several embodiments of the disclosed technology can significantly reduce memory overhead in the host 106. By subdividing the second memory region 134*b* according to the second size larger than the first size, an amount of metadata for the second memory region 134*b* can be significantly reduced than if the second memory region 134*b* is also subdivided according to the first size. For example, assuming a 1% overhead for the metadata memory 124*a* or 124*b*, subdividing one terabyte of memory into memory subregions 123*a* of 4 KB each (i.e., a single memory page) results in about ten gigabytes of metadata memory 124*a*. On the other hand, subdividing one terabyte of memory into memory blocks of one gigabyte each results in about 40 kilobytes of metadata memory 124*b*. By reducing the memory overhead, more memory space in the physical memory 134 may be available for allocation to virtual machines 144 or containers for executing computing tasks. As such, costs for providing computing services from the virtual machines 144 or container at the host 106 may be reduced.

Several embodiments of the disclosed technology can also facilitate efficient update/reset of the operating system 138 on the host 106 while maintaining state information of virtual machines 144 (FIG. 2) or containers hosted on the host 106. For example, during a Kernel Software Reset ("KSR"), the memory manager 150 can be configured to maintain the distribution of the first and second memory region 134*a* and 134*b*. For example, the memory manager 150 can maintain which pages of the second memory region 134*b* are in use by the virtual machines 144 and selectively persist/restore metadata for the pages that are in use. Data of the operating system 138 in the first memory region 134*a* can then be overwritten and updated while data in the second memory region 134*b* is maintained. After reinitializing the operating system 138 in the first memory region 134a, various virtual machines 144 or containers can be resumed on the computing device based on the maintained state information in the second memory region 134b. As such, fast update/reset of the operating system 138 can be achieved while preserving the state information of the virtual machines 144 or containers.

Further, processing latency of allocating memory from the second memory region 134b to virtual machines 144, containers, or other suitable types of guest operating systems can be much lower than allocating memory from the first memory region 134a. The second functional type can have much larger memory subregions than the first functional type. As such, a number of updates to the metadata memory 124b during allocation can be significantly decreased when compared to allocating from the first memory region 134a. For example, allocating one terabyte memory of 4 KB each involves updating metadata in about 10 gigabytes of metadata memory 124a. In contrast, allocating one terabyte memory of one gigabyte each includes updating metadata in about 40 kilobytes of metadata memory 124b. As a result, a speed of instantiating virtual machines 144 or containers and/or other system performance may be improved in the host 106.

Figure 5:
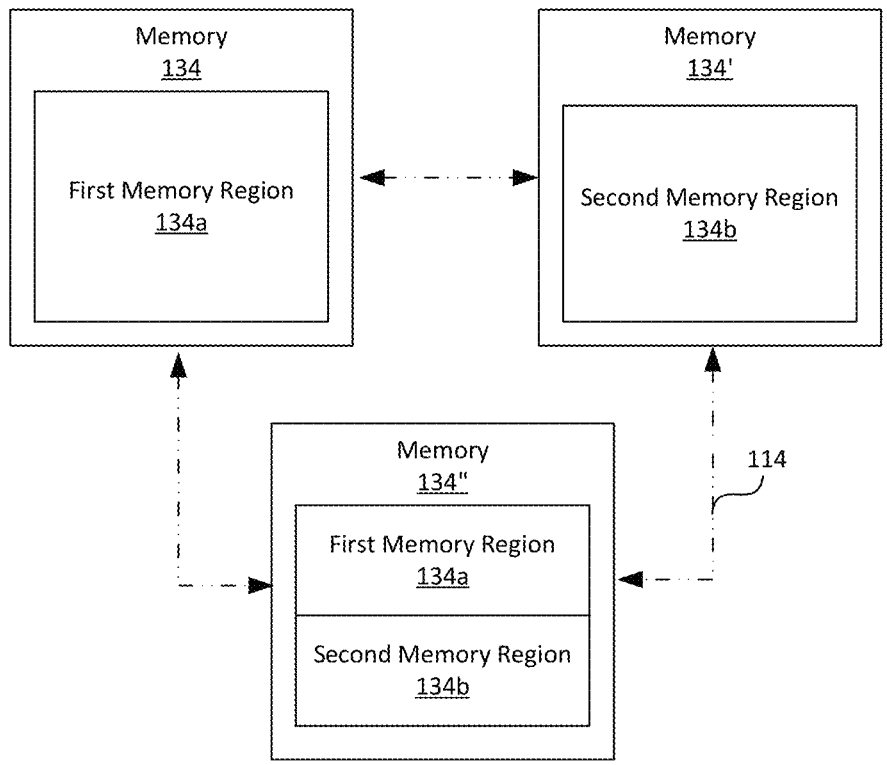
FIG. 5 is a schematic diagram illustrating multiple memory nodes in accordance with embodiments of the disclosed technology.

Though only one physical memory 134 is shown in FIGS. 3A-4D, in other embodiments, the host 106 can have multiple physical memories 134 that are either local or remotely accessible by the processor 132 as shown in FIG. 5. For example, Non-Uniform Memory Access ("NUMA") is a computer memory design according to which a processor can access both local memory and non-local memory (e.g., memory local to another processor or memory shared between processors). Each local or non-local memory 134, 134', and 134" can form a NUMA node. In accordance with several aspects of the disclosed technology, each NUMA node can have corresponding ratios of the first and second memory regions 134a and 134b from 0% to 100%. In one example, as shown in FIG. 5, one NUMA node (e.g., memory 134) can include only a first memory region 134a while another NUMA node (e.g., memory 134') includes only a second memory region 134b. In other examples, at least some of the NUMA nodes (e.g., memory 134") can include both the first and second memory region 134a and 134b at the same ratio or at different ratios.

Figure 6:
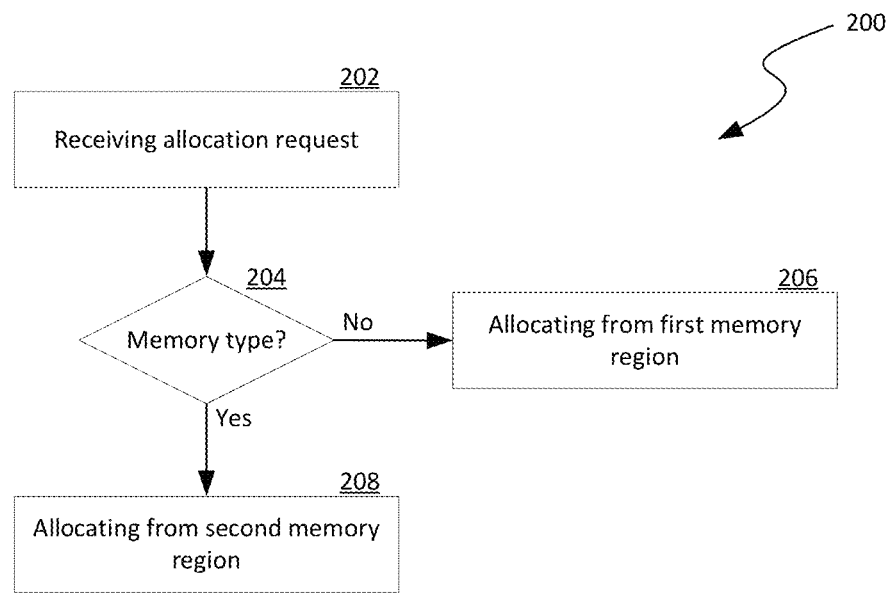
FIG. 6 is a flowchart illustrating a process of memory management in accordance with embodiments of the disclosed technology.

FIG. 6 is a flowchart illustrating a process 200 of memory management in accordance with embodiments of the disclosed technology. Though the process 200 is described below in the context of the host 106 in FIGS. 3A-4D, in other embodiments, the process 200 may be implemented in computing devices or systems with additional and/or different components. As shown in FIG. 6, the process 200 can include receiving an allocation request at stage 202. The process 200 can then include a decision stage 204 to determine whether the request is for allocation from the first memory region 134a or the second memory region 134b of the physical memory 134 (FIGS. 3A-4D). The first memory region 134a has multiple memory subregions 123a of a first size. The second memory region 134b can also have multiple memory subregions 123b of a second size larger than the first size of the first memory region 134a and is not available for allocation to a program or process executed by the processor on the operating system138. Instead, the second memory region 134a is available for allocation to a virtual machine, container, or other suitable types of guest operating system. In response to determining that the request for allocation of memory is for allocation from the first memory region 134a, the process 200 proceeds to allocating a portion of the memory subregions 123a of the first memory region 134a at stage 206. In response to determining that the request for allocation of memory is for allocation from the second memory region 134b, the process 200 proceeds to allocating a portion of the memory subregions 123b of the second memory region 134b at stage 208.

Figure 7:
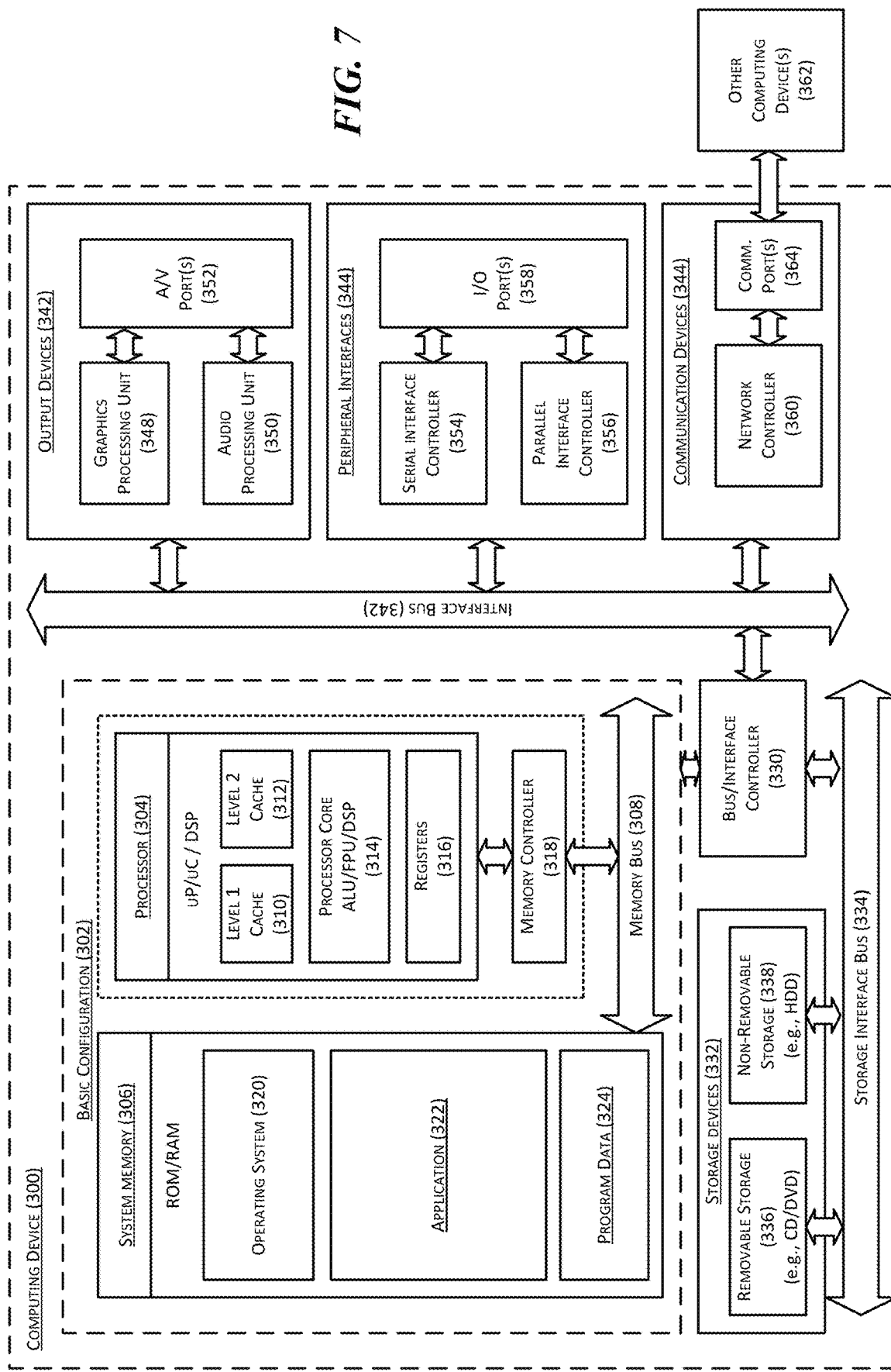
FIG. 7 is a computing device suitable for certain components of the distributed computing system in FIG. 1.

FIG. 7 is a computing device 300 suitable for the host 100 in FIGS. 1-4D. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type storage device including but not limited to volatile memory (such as RAM), nonvolatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A system comprising:
a processing system; and
memory coupled to the processing system, the memory comprising computer executable instructions that, when executed, perform operations comprising:
receiving, at a host operating system, a request for allocation of the memory, the memory comprising: (1) a first memory region allocated to the host operating system and subdivided into a plurality of first memory subregions individually having a first size, and (2) a second memory region allocated to a guest operating system hosted by the host operating system and subdivided into a plurality of second memory subregions individually having a second size larger than the first size;
determining that the request is for allocation from the first memory region; and
allocating a portion of the plurality of first memory subregions.

2. The system of claim 1, wherein the first memory region supports a first set of memory region operations and the second memory region supports a second set of memory region operations that is different from the first set of memory region operations.

3. The system of claim 2, wherein the first set of memory region operations include at least one of: allocation, deallocation, swapping, memory protection, segmentations, or error checking.

4. The system of claim 1, wherein the host operating system comprises a memory manager for concurrently tracking status of the plurality of first memory subregions and the plurality of second memory subregions.

5. The system of claim 4, wherein the memory manager provides a first application programming interface for requests from the host operating system and provides a second application programming interface for requests from the guest operating system.

6. The system of claim 5, wherein the memory manager distinguishes between requests from the host operating system and requests from the guest operating system based on metadata included with the respective requests.

7. The system of claim 6, wherein the metadata includes identifiers of processes registered with the memory manager.

8. The system of claim 4, wherein the memory manager maintains a distribution of the first memory region and the second memory region upon update or reset of the host operating system.

9. The system of claim 1, wherein determining that the request is for allocation from the first memory region comprises determining that the request was provided by a program or process executing in the host operating system.

10. The system of claim 1, wherein determining that the request is for allocation from the second memory region comprises determining that the request was provided by a virtual machine or a container associated with the guest operating system.

11. The system of claim 1, wherein, after the host operating system has been initialized:
a memory subregion of the plurality of second memory subregions can be converted to a memory subregion of the plurality of first memory subregions; and
the memory subregion of the plurality of first memory subregions can be converted to the memory subregion of the plurality of second memory subregions.

12. The system of claim 1, wherein the first size and the second size can be set and adjusted during execution of the host operating system.

13. The system of claim 1, wherein processing latency for allocating the portion of the plurality of second memory subregions to the guest operating system is lower than processing latency for allocating the portion of the plurality of first memory subregions to the guest operating system.

14. The system of claim 1, wherein the system implements non-uniform memory access to enable the processing system to access local memory and non-local memory.

15. A method comprising:
determining whether a request is for allocation from a first memory region or a second memory region of physical memory of a computing device, wherein:

the first memory region is allocated to a first operating system and is subdivided into a plurality of first memory subregions individually having a first size; and the second memory region is allocated to a second operating system and is subdivided into a plurality of second memory subregions individually having a second size larger than the first size; and allocating a portion of the plurality of first memory subregions or a portion of the plurality of second memory subregions, respectively, in response to the request.

16. The method of claim 15, wherein determining whether the request is for allocation from the first memory region or the second memory region comprises determining whether the request originated from the first operating system or the second operating system.

17. The method of claim 16, wherein:

requests originating from the first operating system result in allocations from the first memory region; and requests originating from the second operating system result in allocations from the second memory region.

18. The method of claim 15, wherein:

the first operating system is a host operating system of the computing device; and the second operating system is a guest operating system of the computing device, the guest operating system being hosted by the host operating system.

19. The method of claim 15, wherein:

the first operating system is implemented on a first device; and the second operating system is implemented on a second device that is different from the first device.

20. A system comprising:

a processing system; and memory coupled to the processing system, the memory comprising computer executable instructions that, when executed, perform operations comprising:

receiving, at a host operating system, a request for allocation of the memory, the memory comprising: (1) a first memory region allocated to the host operating system and subdivided into a plurality of first memory subregions individually having a first size, and (2) a second memory region allocated to a guest operating system hosted by the host operating system and subdivided into a plurality of second memory subregions individually having a second size larger than the first size;

determining that the request is for allocation from the second memory region; and allocating a portion of the plurality of second memory subregions.

* * * * *